US012669693B2

(12) United States Patent
Engelhardt et al.

(10) Patent No.: US 12,669,693 B2
(45) Date of Patent: Jun. 30, 2026

(54) OPERATING MICROSCOPE HAVING AT LEAST TWO CAMERA DEVICES

(71) Applicant: Munich Surgical Imaging GmbH, Munich (DE)

(72) Inventors: Ralf Engelhardt, Lübeck (DE); Andreas Fritz, Lübeck (DE); Peter Geissler, Munich (DE); Hans Kiening, Lenggries (DE)

(73) Assignee: Munich Surgical Imaging GmbH, Munich (DE)

( * ) Notice: Subject to any disclaimer, the term of this patent is extended or adjusted under 35 U.S.C. 154(b) by 111 days.

(21) Appl. No.: 18/025,194

(22) PCT Filed: Jun. 2, 2021

(86) PCT No.: PCT/EP2021/064745

§ 371 (c)(1),
(2) Date: Mar. 8, 2023

(87) PCT Pub. No.: WO2022/053189

PCT Pub. Date: Mar. 17, 2022

(65) Prior Publication Data

US 2023/0324668 A1      Oct. 12, 2023

(30) Foreign Application Priority Data

Sep. 8, 2020     (DE) ..................... 10 2020 123 365.5

(51) Int. Cl.
*G02B 21/00*       (2006.01)
*G02B 21/16*       (2006.01)
*G02B 21/36*       (2006.01)

(52) U.S. Cl.
CPC ........... *G02B 21/367* (2013.01); *G02B 21/16* (2013.01); *G02B 21/361* (2013.01)

(58) Field of Classification Search
CPC .... G02B 21/367; G02B 21/16; G02B 21/361; G02B 21/22; G02B 27/10
(Continued)

(56) References Cited

U.S. PATENT DOCUMENTS

| | | | | |
|---|---|---|---|---|
| 5,682,244 A | * | 10/1997 | Barlow | ................... G01P 5/001 356/417 |
| 9,404,739 B2 | * | 8/2016 | Nakatsukasa | .......... G01B 11/25 |

(Continued)

FOREIGN PATENT DOCUMENTS

| | | |
|---|---|---|
| CN | 1715987 | 1/2006 |
| CN | 101031837 | 9/2007 |

(Continued)

OTHER PUBLICATIONS

Internationaler Recherchenbericht und Schriftlicher Bescheid [International Search Report and the Written Opinion] Dated Nov. 4, 2021 From the International Searching Authority Re. Application No. PCT/EP2021/064745 and Its Translation Into English. (28 Pages).

*Primary Examiner* — Trang U Tran

(57) ABSTRACT

In order to achieve the aim of the invention, which is to provide an operating microscope which allows images of tissue structures to be captured and displayed as accurately as possible, an operating microscope comprising a first camera device (1) for capturing and displaying a reflection image of an object is characterised by a second camera device (2) for simultaneously capturing and displaying a further image of the object.

18 Claims, 3 Drawing Sheets

(58) Field of Classification Search
USPC ........................................................ 348/79
See application file for complete search history.

(56) References Cited

U.S. PATENT DOCUMENTS

| | | | |
|---|---|---|---|
| 10,151,909 B2 * | 12/2018 | Weber | G02B 21/0012 |
| 12,352,941 B2 * | 7/2025 | Spiecker | G02B 21/26 |
| 2004/0109231 A1 | 6/2004 | Haisch et al. | |
| 2014/0049633 A1 | 2/2014 | Pretorius et al. | |
| 2015/0260978 A1 * | 9/2015 | Cremer | G02B 21/361 |
| | | | 348/79 |
| 2016/0154193 A1 * | 6/2016 | Brukilacchio | G02B 5/003 |
| | | | 385/33 |
| 2016/0206198 A1 | 7/2016 | Weber | |
| 2019/0004304 A1 | 1/2019 | Gaiduk et al. | |
| 2019/0175402 A1 | 6/2019 | Eil et al. | |
| 2020/0249454 A1 * | 8/2020 | Kobayashi | G01J 3/10 |
| 2020/0379229 A1 * | 12/2020 | Huang | G02B 21/06 |
| 2022/0117696 A1 * | 4/2022 | Shi | A61B 90/30 |
| 2022/0207850 A1 * | 6/2022 | Okuike | G06V 10/147 |
| 2023/0092749 A1 * | 3/2023 | Cutrale | G01N 21/6428 |
| | | | 250/459.1 |

FOREIGN PATENT DOCUMENTS

| | | |
|---|---|---|
| CN | 103257437 | 8/2013 |
| CN | 105359029 | 2/2016 |
| CN | 106264742 | 1/2017 |
| CN | 107920726 | 4/2018 |
| CN | 108227173 | 6/2018 |
| CN | 111465343 | 7/2020 |
| DE | 102005005253 | 11/2005 |
| DE | 102005032354 | 1/2007 |
| DE | 102010044502 | 3/2012 |
| DE | 102015100765 | 7/2016 |
| DE | 112015001241 | 11/2016 |
| DE | 102018110643 | 7/2019 |
| DE | 102019118508 | 12/2020 |
| JP | 2010-142641 | 7/2010 |
| WO | WO 2005/034747 | 4/2005 |

* cited by examiner

OPERATING MICROSCOPE HAVING AT LEAST TWO CAMERA DEVICES

RELATED APPLICATIONS

This application is a National Phase of PCT Patent Application No. PCT/EP2021/064745 having International filing date of Jun. 2, 2021, which claims the benefit of priority of Germany Patent Application No. 10 2020 123 365.5 filed on Sep. 8, 2020. The contents of the above applications are all incorporated by reference as if fully set forth herein in their entirety.

FIELD AND BACKGROUND OF THE INVENTION

The invention relates to an operating microscope according to the preamble of claim 1.

It is already known to capture so-called reflection images of organic tissue. In this case, light is guided onto tissue to be examined and light reflected by the tissue is captured in order to generate reflection images. It is also known to capture so-called fluorescence images of organic tissue. Fluorescein, for example, may be distributed as an indicator in the tissue and excited into fluorescence by light. Fluorescein is a dye which fluoresces and, in particular, is used as an indicator in ophthalmology.

Against this background, operating microscopes with which organic tissue can be examined are currently used. Operating microscopes are used by doctors in a very wide variety of medical specialisms in order to capture images of organs or organ regions during an operation and in order to make a medical diagnosis with the aid of these images.

Irrespective of the medical discipline, the depth of field of camera-based operating microscopes is constantly being criticized by surgeons.

SUMMARY OF THE INVENTION

The object of the invention is therefore to provide an operating microscope which allows the most accurate possible capture and pictorial representation of tissue structures.

The present invention achieves the aforementioned object by the features of claim 1.

The use of two simultaneously operating camera devices permits capture and representation of reflection images and further images, for example fluorescence images, at the same time. By using two camera devices, it is possible to provide two camera planes, the camera devices supplementing one another during the image capture and representation and thus being able to compensate for quality losses during the image capture. If at least one of the camera devices consists of two cameras in a stereo arrangement, a spatial impression may be optically generated for the user. The tissue can be examined and observed very comprehensively. Chronologically alternating acquisition and representation of two imaging modes, for example reflection mode and fluorescence mode, may be dispensed with because of a flickering illumination required therefor and the associated distracting effects.

According to the invention, an operating microscope is assigned a second camera plane. Besides fluorescence representation at the same time, the second camera plane also offers further possibilities of optical representation improvement, for example so-called focus stacking, increasing the resolution by intermediate sampling, noise reduction and extension of the dynamic range by different exposure of the various camera units or camera devices.

"Focus stacking" to a person skilled in the art means the concept of an increase in the depth of field which is achieved by a combination of optical photographic capture techniques and digital image editing or image processing. Thus, images having a very large depth of field may be generated.

Against this background, each camera device could have at least two individual cameras. The two preferred operating modes, namely reflection mode and fluorescence mode, each generate a three-dimensional impression for the user. In order to generate this three-dimensional impression, two detection channels per camera device are respectively used. Both detection channel pairs preferably use the same zoom optics in order to keep the structure of an optical arrangement as simple as possible.

At least one camera device or both camera devices could perform image recordings in the video mode. Thus, movements of the tissue may also be captured well. The two preferred operating modes, namely reflection mode and fluorescence mode, may be carried out on the basis of video recordings. Thus, an in-situ examination of the tissue as well as a chronologically subsequent check of the video recordings, preferably outside an operating room, may be carried out.

The further image could be configured as a fluorescence image of the object. Thus, reflection images and fluorescence images of the same object may be acquired, represented and evaluated at the same time.

Against this background, one illumination device could have a fluorescence excitation light source. Alternatively, two illumination devices could be provided, each having a fluorescence excitation light source.

To this extent, there is initially only a basic design of the operating microscope, although it may be supplemented with further light sources.

In another embodiment of the operating microscope, a light source present for the generation of reflection images could be turned off during the detection of the fluorescence. In this way, further filters are not necessary in order to stop out a wavelength range at which fluorescence takes place.

A blocking filter or else barrier filter could be provided, which is placed optically in front of the two camera devices so that a light pencil component incident on the two camera devices has to pass through the blocking filter. For a fluorescence mode, there must be a sufficiently large spectral power density at the wavelength of the excitation light of the illumination device. Spectral ranges of the excitation light, or of the excitation light reflected as reflection light, may be stopped out simultaneously for both camera pairs by the blocking filter.

The blocking filter could, for example, against this background, not transmit, or at least suppress, light with a wavelength from the wavelength range of 480 nm to 490 nm. Fluorescein is excited into fluorescence by excitation light of the wavelength 485 nm. Preferably, the excitation light may be stopped out for each wavelength individually. In the case of narrowband excitation, such as may be generated by a laser, the blocking filter may also remain in the beam path during other modes and/or be configured statically if white balancing is furthermore possible. Preferably, a filter change option is provided by design in the optical arrangement.

When the operating microscope is operating in the fluorescence mode, the wavelength range detected during a respective fluorescence must be filtered out from the spectrum of the illumination device so that excitation light reflected as reflection light, or returning excitation light, is not superimposed on the fluorescence acquisition on or by the second camera device. This is preferably achieved by a light module, which is preferably not provided in the camera device.

In the fluorescence mode, the light which impinges on the second camera device must be filtered by a suitable bandpass filter or bandwidth filter for the wavelength to be detected, in order to stop out the reflection light, incident on the second camera device, of the excitation light. This bandpass filter could preferably be capable of being switched over for different dyes, or could be capable of being moved away when other modes are active.

Against this background, a bandpass filter could be provided, which is placed optically in front of the second camera device so that a light pencil component incident on the second camera device has to pass through the bandpass filter before it impinges on the second camera device.

The bandpass filter could therefore, for example, transmit light with a wavelength from the wavelength range of 510 nm to 540 nm and not transmit, or at least suppress, the rest of the spectral range. In this way, a large proportion of the fluorescence light of fluorescein is transmitted to the second camera device and rather nonessential light is stopped out.

Against this background, an optical arrangement in which the blocking filter is not present is therefore also conceivable, specifically when the bandpass filter completely suppresses the excitation light reflected as reflection light before the second camera device and the high spectral power density at the wavelength of the excitation light can be tolerated, or corrected, during the representation of the reflection image simultaneously taking place via or by the first camera device. If a blocking filter is not present, the bandpass filter must also suppress the high spectral power density of the excitation light. The blocking filter is then preferably integrated in the bandpass filter.

At least one beam splitter, preferably a 50:50 beam splitter, onto which a first light pencil component can be guided for splitting into a second and a third light pencil component, could be arranged in the beam path between an objective over the specimen and the two camera devices. By this beam splitter, at least a part of the light which is reflected by the specimen or is emitted as fluorescence light, namely reflection light and fluorescence light, can be guided simultaneously to the two camera devices.

Against this background, the beam splitter could guide the second light pencil component in the direction of the first camera device and guide the third light pencil component, through a bandpass filter in front of the second camera device, onto the latter. Thus, in a filtered manner, light for reflection images may be guided to the first camera device and light for fluorescence images to the second camera device.

An OCT apparatus, by the sampling light of which the specimen can be examined, could also be provided in addition. Thus, besides reflection images and fluorescence images, OCT images may also be acquired in a known way.

The term optical coherence tomography, (conventionally abbreviated to OCT) refers to an image generation method. With this method, two-dimensional and three-dimensional images may be obtained from light-scattering organic tissues.

Irrespective of the medical discipline, the depth of field of camera-based operating microscopes is constantly being criticized by surgeons. Owing to the lack of the observer's capability of accommodation, the depth of field is reduced to the numerical aperture, dictated by the geometrical aperture, of the objective of the operating microscope.

Reduction of the aperture diameter in order to increase the depth of field is only limitedly possible because this is associated both with a possibly unusable brightness increase, which ultimately leads to heating of the tissue, and associated with a signal amplification so that an increase in the noise takes place, and is associated with a decrease in the MTF so that there is a lower resolution.

The abbreviation MTF refers to the so-called modulation transfer function, or contrast transfer function, which mathematically describes a comparison between the detail contrast at edges of an object and the detail contrast of its pictorial representation.

Against this background, an operating microscope of the type described here could have an image processing device which connects at least one first image, which is acquired by the first camera device, to at least one further image, which is acquired by the second camera device, the images being selected by the image processing device on the basis of a predefined sharpness quality of the images and composited to form an overall image.

The second camera device described here, namely a second camera plane, may inter alia be used to patch regions with acceptable sharpness together. In this case, the imaging plane of the second camera plane would be displaced relative to the first, for example by half the depth of field range. The final image or overall image would then be combined algorithmically from the two slice acquisitions, or images.

Static or temporal denoising algorithms for noise reduction, with which parameterizable noise can be suppressed, could additionally be used. By the synchronization of the sampling of the two camera planes or camera devices, methods which are based on time averaging could also be employed. So-called temporal oversampling may take place.

Image sensors which are sensitive for infrared light, preferably for infrared light from the wavelength range of from 1000 to 1500 nm, could be provided in the first and/or second camera device. For hyperspectral image generation, for example in the infrared range of up to 1500 nm, it could be possible to use image sensors which are sensitive in the far infrared and are used for spectral tissue differentiation. Tumor detection is preferably carried out in the spectral range of 1000-1500 nm.

A resolution increase could take place by oversampling. By diagonal displacement of two sampling grids with respect to one another by one half of a pixel, the resolution may be increased by about 1.4 times, i.e. root 2 times.

In the case of so-called downsampling to the display size of the image, for example HD or 4K, the shape of the MTF and therefore the sharpness of the image may be influenced.

The advantage of this technique primarily leads not to a resolution increase but to a sharper image. This is attributable to the boosting of the low spatial frequencies. Furthermore, the oversample image could be used for loss-free digital enlargement and/or zooming.

By different amplification or different illumination or different exposure of the two camera planes or camera devices, a dynamic range could be increased.

One particular feature is the balancing of the characteristic curves of the two image pairs, that is to say configuring the join in the transition region in such a way that an artefact-free HDR image is obtained.

DESCRIPTION OF SPECIFIC EMBODIMENTS OF THE INVENTION

Figure 1:
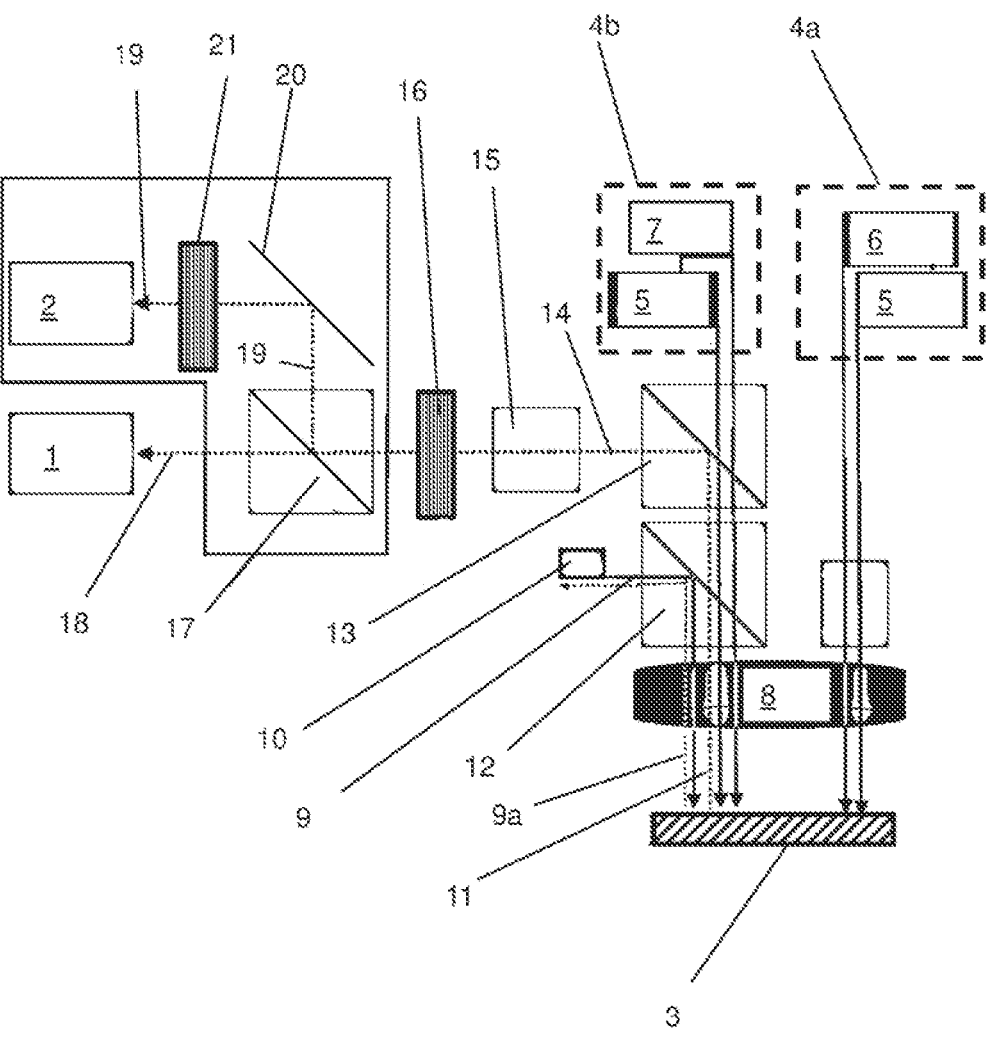
FIG. 1 shows a schematic representation of an optical arrangement in a camera-based operating microscope.

FIG. 1 shows an operating microscope comprising a first camera device 1 for capturing and representing a reflection image of an object, the operating microscope having a second camera device 2 for simultaneously capturing and representing a further image of the object.

FIG. 1 also shows an arrangement for use in an operating microscope, comprising a first camera device 1 for capturing and representing reflection images. The arrangement is characterized by a second camera device 2 for simultaneously capturing and representing fluorescence images. The further image is to this extent a fluorescence image.

Each camera device 1, 2 has at least two cameras. Each camera device 1, 2 is to this extent a camera pair. At least one camera device 1, 2 or both camera devices 1, 2 performs or perform image recordings in the video mode. The first camera device 1 is used to capture reflection images. The second camera device 2 is used to capture fluorescence images.

At least one illumination device 4a, 4b having a fluorescence excitation light source 5 is provided, or two illumination devices 4a, 4b are provided, each having a fluorescence excitation light source 5. An illumination device 4a, 4b comprises a field illumination light source 6 and/or an SCI light source 7. The abbreviation SCI stands for "Stereo Confocal Illumination".

The illumination of the object, namely a specimen 3, in particular an organic tissue, may to this extent be carried out by means of two alternatives. According to the first alternative, a first illumination device 4a comprises as fluorescence excitation light source 5 a field illumination light source 6. The fluorescence illumination is generated by the field illumination light source 6.

According to a second alternative, a second illumination device 4b comprises as the fluorescence excitation light source 5 an SCI light source 7.

In a first embodiment of the arrangement, the SCI light source 7 is absent. This operating microscope constitutes a basic design. In another design, a physically present SCI light source 7 may be turned off during the detection of the fluorescence.

The excitation light from an illumination device 4a, 4b impinges through an objective 8 on the specimen 3 and excites the latter to emit fluorescence light since fluorescein is present in the specimen 3. At the same time, the excitation light impinging on the specimen 3 is at least partially reflected by the specimen 3 as reflection light.

Furthermore, according to a particular embodiment of the arrangement, sampling light 9 of an OCT apparatus 10 also impinges on the specimen 3 so that the latter can be examined in more detail.

The reflection light reflected onto the incident excitation light of the illumination device 4a, 4b by the specimen 3 and the fluorescence light, represented in FIG. 1 by a returning light ray pencil 11, initially passes through or circumvents a first beam splitter 12 and then passes through a second beam splitter 13. Light 9a sent back by the specimen 3 onto the sampling light 9 of the OCT apparatus 10 is guided through the first beam splitter 12 of the OCT apparatus 10 to the further processing.

By the second beam splitter 13, a first light pencil component 14 is directed through zoom optics 15, for example an objective having a variable focal length, through a blocking filter 16 onto a third beam splitter 17, namely a 50:50 beam splitter. The first light pencil component 14 is split into a second light pencil component 18 and into a third light pencil component 19. The third beam splitter 17 could, in another embodiment, be configured to be dichroic.

The second light pencil component 18 impinges on the first camera device 1 in order to generate reflection images. After deflection by a mirror 20 and after passing through a bandpass filter 21, the third light pencil component 19 impinges on the second camera device 2 in order to generate fluorescence images.

In one embodiment of the arrangement, the blocking filter 16 is placed in front of both camera devices 1, 2 so that a first light pencil component 14 impinging on the camera devices 1, 2 has to pass through the blocking filter 16. The blocking filter 16 does not transmit light with a wavelength from the wavelength range of 480 nm to 490 nm.

The bandpass filter 21 is placed in front of the second camera device 2 so that a third light pencil component 19 impinging on the second camera device 2 has to pass through the bandpass filter 21. The bandpass filter 21 transmits light with a wavelength from the wavelength range of 510 nm to 540 nm and does not transmit light of the rest of the spectral range.

Arranged in the beam path between the objective 8 and the two camera devices 1, 2 in all embodiments is the third beam splitter 17, onto which the first light pencil component 14 can be guided for splitting into the second and third light pencil components 18, 19. The third beam splitter 17 guides the second light pencil component 18 in the direction of the first camera device 1 and the third light pencil component 19 through the bandpass filter 21 in front of the second camera device 2, onto the latter.

The optionally provided blocking filter 16 and the bandpass filter 21 are intended to filter out the excitation light which, in particular, could impinge as reflection light on the second camera device 2 and interfere with the detection of the actual fluorescence.

Excitation of the known indicator fluorescein by excitation light of the illumination device 4a, 4b preferably takes place at a wavelength of 485 nm. Light with this wavelength is blue. More than 80% of the fluorescence excited by this light occurs in the range of 510 to 540 nm. Depending on the width of the spectrum of the excitation light, the blocking filter 16 must therefore block the wavelengths around 485 nm with a width of about 5 nm, but transmit the rest of the visible range. This optical behavior is schematically represented at the very top in FIG. 2. The blocking filter 16 is not absolutely necessary, so that in one embodiment of the arrangement the blocking filter 16 may be omitted.

Figure 2:
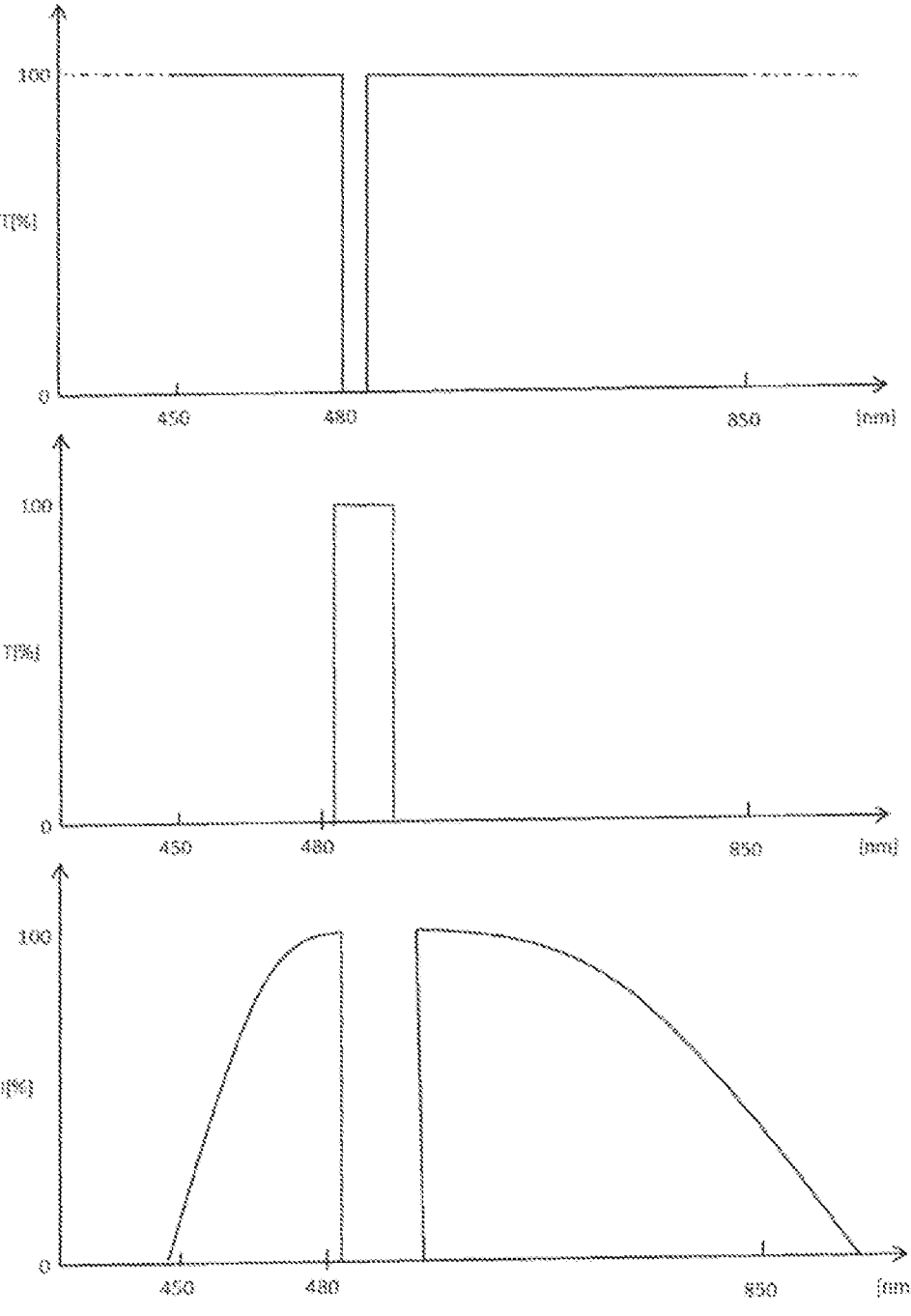
FIG. 2 shows (top) the transmission behavior of a blocking filter which blocks the transmission of a wavelength range around 485 nm with a width of about 5 nm and transmits visible light of the rest of the wavelength range, (middle) the transmission behavior of a bandpass filter which is transparent for the wavelength range of 510 to 540 nm and blocks the entire rest of the spectral range for which the second cameras are sensitive, (bottom), an illumination spectrum from which the spectral range of 510 to 540 nm is stopped out.

The bandpass filter 21 is transparent for the fluorescence light to be detected with wavelengths in the range of 510 to 540 nm, and blocks the entire rest of the spectral range for which the second camera device 2 could be sensitive. This optical behavior of the bandpass filter 21 is represented in FIG. 2 in the middle. In particular, the high spectral power density of the excitation light must be blocked.

The spectral range of 510 to 540 nm could be stopped out from the spectrum of the excitation light of the illumination device 4a, 4b. At the wavelength 485 nm, however, the required power density must be made available. This is represented at the very bottom in FIG. 2. The illumination device 4a, 4b could therefore be provided with a filter, preferably an adjustable filter, which can block each fluorescence light wavelength so that it does not impinge on the second camera device 2 as interfering reflection light. Each adjustment position of this filter represents an achievable fluorescence light wavelength and a basic position represents a neutral state.

In order to produce the blocking filter 16, a filter wheel having x positions could be provided in the relevant beam paths. Each adjustment position then represents an achieved fluorescence light wavelength and a basic position represents a neutral state. In order to produce the bandpass filter 21, a filter wheel having x positions could likewise be provided in the relevant beam paths in front of the second camera device 2. Each adjustment position represents an achieved fluorescence light wavelength and a basic position represents a neutral state.

Thus, each wavelength range in which fluorescence is detected could be filtered out from the excitation light, or excitation light reflected as reflection light, of the illumination device 4a, 4b.

The excitation of the fluorescence could also be carried out with a laser having a wavelength of about 488 nm. Fluorescence or a reflection image generated by the laser may be acquired. In both cases, about 1/10 000 of the incident light is recovered, that is to say a blue image has the same gray levels as a fluorescence image.

Figure 3:
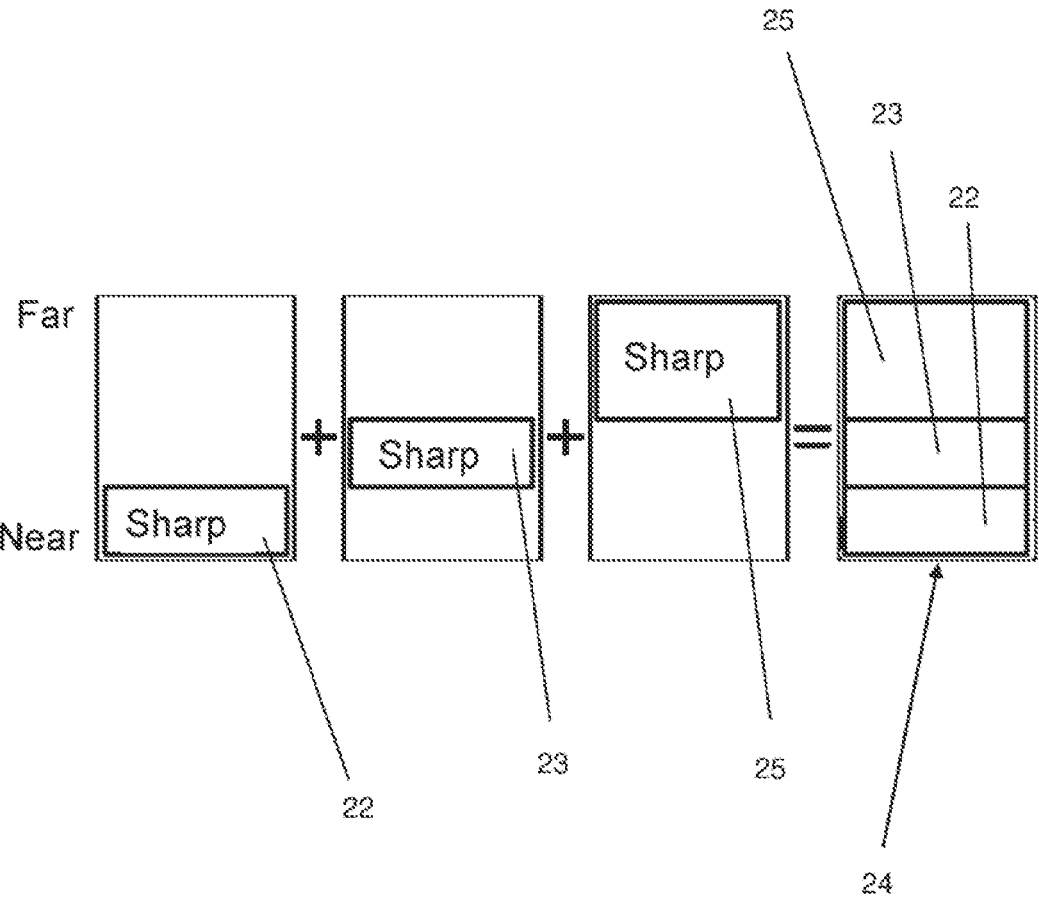
FIG. 3 shows a schematic example of a combination of three images, namely slice acquisitions, which are composited to form an overall image by patching together.

FIG. 3 shows that a further embodiment of an operating microscope has an image processing device which connects at least one first image 22, which is acquired by a first camera device 1, to at least one further image 23, which is acquired by a second camera device 2, the images 22, 23 being selected by the image processing device on the basis of a predefined sharpness quality of the images 22, 23 and composited to form an overall image 24. Furthermore, the overall image 24 also has a third image 25 which has been selected on the basis of its sharpness for the patched compositing of the overall image 24.

LIST OF REFERENCES

1 first camera device
2 second camera device
3 specimen
4a first illumination device
4b second illumination device
5 fluorescence excitation light source
6 field illumination light source of 4a
7 SCI light source of 4b
8 objective
9 sampling light
9a light sent back by 3
10 OCT apparatus/OCT interferometer
11 returning light ray pencil
12 first beam splitter
13 second beam splitter
14 first light pencil component
15 zoom optics
16 blocking filter
17 third beam splitter

18 second light pencil component
19 third light pencil component
20 mirror
21 bandpass filter
22 first image
23 second or further image
24 overall image
25 third image

The invention claimed is:

1. An operating microscope, comprising:
   a first camera device having at least two cameras for capturing a three-dimensional impression and representing the three-dimensional impression as at least one reflection image of an object,
   an image processing device configured to composite from the at least one reflection image and the at least one further image an overall image;
   wherein the at least one reflection image and the at least one further image are selected by the image processing device according to a selection criterion defining a predefined image sharpness quality; and
   a second camera device having at least two cameras for simultaneously capturing another three-dimensional impression and representing the another three-dimensional impression as at least one further image of the object.

2. The operating microscope as claimed in claim 1, wherein at least one of the first and second camera devices performs image recordings in the video mode.

3. The operating microscope as claimed in claim 1, wherein the representation of the images takes place in real time.

4. The operating microscope as claimed in claim 1, wherein at least one of the first and second camera devices performs three-dimensional image recordings.

5. The operating microscope as claimed in claim 1, wherein the first and second camera devices acquire different light intensities.

6. The operating microscope as claimed in claim 1, wherein the first and second camera devices operate with different exposure times.

7. The operating microscope as claimed in claim 1, wherein the at least one further image is a fluorescence image of the object.

8. The operating microscope as claimed in claim 1, further comprising at least one illumination source having a fluorescence excitation light source.

9. The operating microscope as claimed in claim 1, further comprising a blocking filter placed in front of the first and second camera devices so that a light pencil component incident on any of the at least two cameras passes therethrough.

10. The operating microscope as claimed in claim 9, wherein the blocking filter at least suppresses light with a wavelength between 480 nanometer (nm) and 490 nm.

11. The operating microscope as claimed in claim 8, wherein the at least one illumination light source is configured to block fluorescence at a wavelength range out from illumination spectrum.

12. The operating microscope as claimed in claim 1, further comprising a bandpass filter placed in front of the second camera device so that a light pencil component incident on any of the at least two cameras passes therethrough.

13. The operating microscope as claimed in claim 1, further comprising an OCT apparatus examining a specimen by a sampling light.

14. The operating microscope as claimed in claim 1, wherein image sensors which are sensitive for infrared light, preferably for infrared light from the wavelength range of 1000 to 1500 nm, are provided in the first and/or second camera device.

15. The operating microscope as claimed in claim 1, wherein the at least two cameras of the second camera device captures fluorescence images of the object for three-dimensional image recordings.

16. An operating microscope, comprising:

a first camera device having at least two cameras for capturing a three-dimensional impression and representing the three-dimensional impression as at least one reflection image of an object;

a second camera device having at least two cameras for simultaneously capturing another three-dimensional impression and representing the another three-dimensional impression as at least one further image of the object; and an image processing device configured to composite from the at least one reflection image and the at least one further image an overall image;

wherein the at least one reflection image and the at least one further image are selected by the image processing device according to a selection criterion defining a predefined image sharpness quality.

17. The operating microscope as claimed in claim 16, wherein at least one beam splitter is directly interposed in the path between the object and the at least two cameras.

18. The operating microscope as claimed in claim 16, wherein the at least two cameras are sensitive in all of the visible spectrum.

* * * * *